July 1, 1930.  L. H. SPRINKLE  1,769,807
MOLD FOR FORMING ARTIFICIAL TEETH AND FACINGS
Filed Oct. 17, 1928
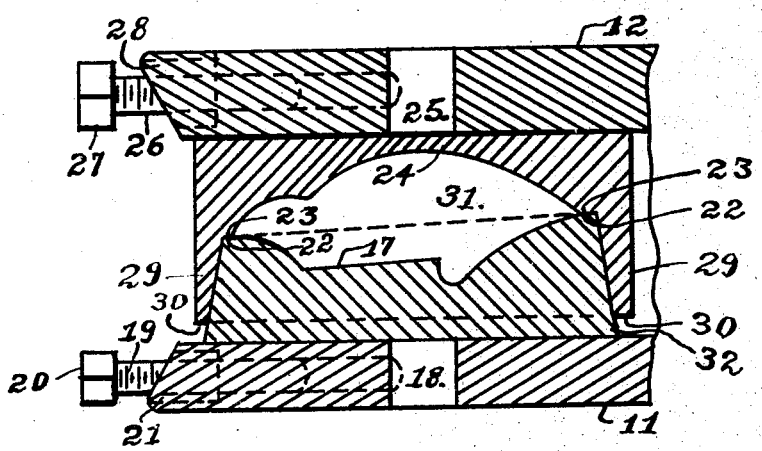
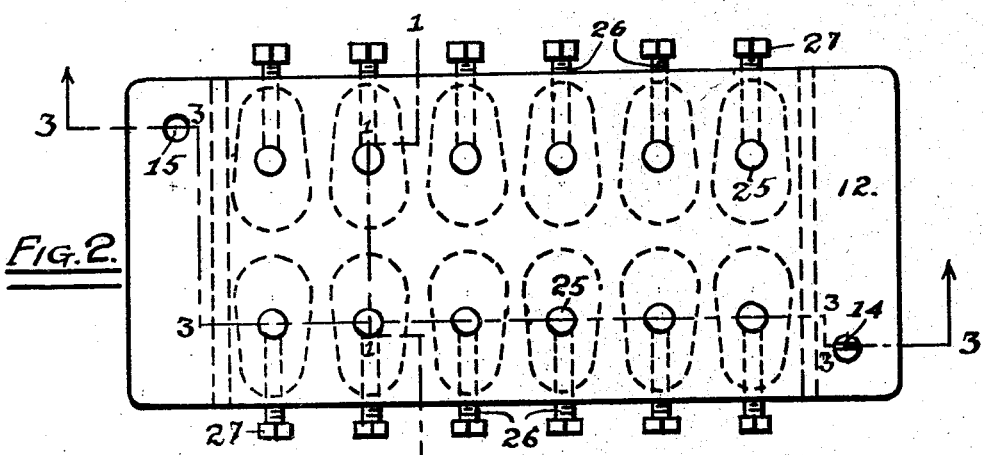
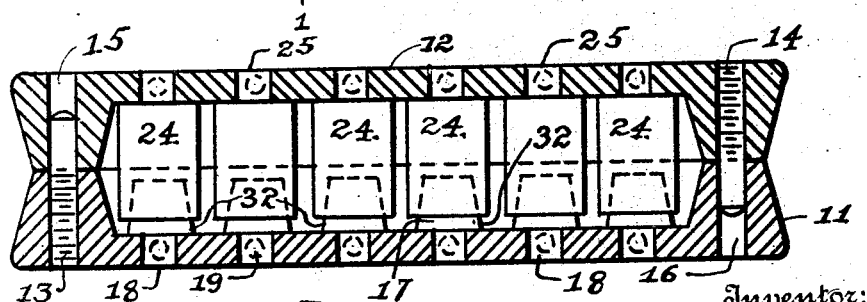
Inventor:
Lake H. Sprinkle
By his Attorney
Israel Benjamins Patented July 1, 1930

1,769,807

UNITED STATES PATENT OFFICE

LAKE H. SPRINKLE, OF BROOKLYN, NEW YORK

MOLD FOR FORMING ARTIFICIAL TEETH AND FACINGS

Application filed October 17, 1928. Serial No. 313,042.

My invention relates to improvements in molds for forming artificial teeth and facings, and it consists in the novel features which are hereinafter described.

One of the objects of my invention is to provide a mold for forming teeth and facings under pressure, thereby making the teeth and facings more compact and of superior quality.

Another object of my improvement is to make the individual molds or dies of a set of molds or dies readily replaceable, thereby providing for breakage and replacement of some of the molds and for the rejection of defective castings of some of said molds.

A further object of my invention is to provide means for securing the individual molds or dies to the holders or plates of a set of molds, which are hereinafter described.

A further object of my improvement is to facilitate and improve the casting of the molds by casting each individual mold of a set separately as a discontinuous mass, which may be connected to other molds only by a common gate when said molds are cast in multiple units.

Another object of my invention is to make my improved mold for forming artificial teeth and facings simple, durable, and inexpensive.

Other objects and advantages will hereinafter appear.

I attain these objects by the mold for forming artificial teeth and facings, one form of which is illustrated in the accompanying drawings or by any mechanical equivalent or obvious modification of the same.

In the drawings Fig. 1 is a fragmentary sectional view on the broken line 1—1 of Fig. 2, drawn to an enlarged scale and showing the tooth and stems of the part-molds or dies in elevation.

Fig. 2 is a plan view of my mold for forming artificial teeth and facings drawn to a smaller scale than Fig. 1.

Fig. 3 is a longitudinal section on the broken line 3—3 of Fig. 2.

Like numerals refer to like parts throughout the several views:

11 designates the lower holder or plate for supporting part-molds or dies and 12 the upper holder or plate of my mold for forming artificial teeth and facings.

Partly threaded pins 13 and 14 are shown as secured each to the diagonally opposite corners of each of said holders 11 and 12 respectively, to fit into openings 15 and 16 of the opposite holder for convenience in matching the parts of the said mold to each other.

Individual male dies or part-molds 17 are positioned on said holder 11 and have thereon stems 18, which extend into corresponding openings in said holder 11; set screws 19 are provided in said holder 11 to engage said stems 18, thereby securing said part-molds or dies 17 in position.

Heads 20 are provided on said set screws 19, as shown in Fig. 1, for tightening them on to said stems 18 when assembling the part molds or dies, and recesses 21 are provided in said holder 11, as shown in dotted lines in Fig. 1, for housing said heads 20 therein.

A seat 22 is provided on the periphery of each of said part-molds or dies 17, to receive a bench or berm 23 of a corresponding female die or part-mold 24, which is connected to said holder 12 by means of a stem 25 and a set screw 26, which has thereon a head 27.

Recesses 28 are provided in said holder 12, as shown in dotted lines in Fig. 1, for housing therein said heads 27 when said set screws 26 are brought home to engage said stems 25.

A curtain wall 29 is provided at the periphery of each of said part-molds or dies 24, to overlap the upper end of the corresponding part-mold or die 17 below said seat 22 and bench or berm 23, said curtain wall extending all around said upper end, thereby encompassing the same, as shown in Figs. 1 and 2.

Said curtain wall 29 terminates at the lower end thereof in an edge 30, which is positioned at a distance from said holder 11 when said part-molds or dies 17 and 24 are in contact with each other as shown in Fig. 1, when a tooth 31 is formed.

In the operation of my improved mold for forming artificial teeth or facings each part-mold or die 24 is filled with molding material, such as porcelain powder, up to the edge 30 thereon; each part-mold or die 17 is also filled with material up to the seat 22 thereon; the part-molds or dies 24 are then pressed on to said part-molds or dies 17 until said berms 23 come into contact with said seats 22 after the excess of material has been forced out between said curtain walls 29 and the exterior sides 32 of said part-molds or dies 17.

In this way the molding material of a tooth is being compressed and compacted between said part-molds or dies 24 and 17 when a tooth 31 is formed therebetween, whereby the density and strength of the said tooth or facing are increased, and the appearance of the latter is also improved.

By making the part-molds or dies individual and replaceable, provision is made against breakage of any one or some of the part-molds or dies 17 and 24, thereby obviating the need of abandoning an entire set of part-molds or dies when one or some of the latter are broken.

The part-mold may also be made in solid blocks if desired.

Many changes may be made in the details of my mold for forming artificial teeth and facings without departing from the main scope of my invention and parts of my invention may be used without other parts.

I do not therefore restrict myself to the details of my mold for forming artificial teeth and facings as shown in the drawings, but I intend to include also all mechanical equivalents and obvious modifications of the same within the scope of my invention.

I claim as my invention, and desire to secure by Letters Patent:

1. In a mold for forming artificial teeth and facings a pair of substantially horizontally disposed holders for part-molds, multiple pairs of part-molds, stems on said part-molds positioned between said holders, and openings in said holders to fit said stems, for detachably connecting said part-molds to said holders.

2. In a mold for forming artificial teeth and facings a pair of substantially horizontally disposed holders for part-molds, multiple pairs of part-molds positioned between said holders, stems on said part-molds, openings in said holders to fit said stems, and means on said holders for locking said stems in position in said openings, thereby detachably connecting said part-molds to said holders.

3. In a mold for forming artificial teeth and facings one or more pairs of individual male and female part-molds, a seat on one part-mold of each pair, a berm on the other part-mold, to fit said seat, and a curtain wall on the periphery of said female part-mold, to overlap and encompass the upper end of said male part-mold below said seat and said berm, said curtain wall extending all around said upper end, thereby encompassing the same when said part-molds are brought together with molding material therein, whereby said material may be compressed between said part-molds before said berm comes into contact with said seat.

LAKE H. SPRINKLE.